US008921260B2

(12) United States Patent
Shao et al.

(10) Patent No.: US 8,921,260 B2
(45) Date of Patent: Dec. 30, 2014

(54) PLATINUM MONOLAYER ON HOLLOW, POROUS NANOPARTICLES WITH HIGH SURFACE AREAS AND METHOD OF MAKING

(75) Inventors: Minhua Shao, Farmington, CT (US); Lesia V. Protsailo, Bolton, CT (US)

(73) Assignee: Ballard Power Systems Inc., Burnaby (CA)

( * ) Notice: Subject to any disclaimer, the term of this patent is extended or adjusted under 35 U.S.C. 154(b) by 35 days.

(21) Appl. No.: 13/578,714

(22) PCT Filed: Feb. 12, 2010

(86) PCT No.: PCT/US2010/000415
§ 371 (c)(1),
(2), (4) Date: Aug. 13, 2012

(87) PCT Pub. No.: WO2011/099957
PCT Pub. Date: Aug. 18, 2011

(65) Prior Publication Data
US 2012/0316060 A1    Dec. 13, 2012

(51) Int. Cl.
| | | |
|---|---|---|
| B01J 23/42 | (2006.01) | |
| B01J 23/44 | (2006.01) | |
| B01J 23/58 | (2006.01) | |
| H01M 4/02 | (2006.01) | |
| H01M 4/36 | (2006.01) | |
| H01M 4/90 | (2006.01) | |
| H01M 4/92 | (2006.01) | |
| H01M 4/94 | (2006.01) | |
| H01M 8/10 | (2006.01) | |
| H01M 8/08 | (2006.01) | |

(52) U.S. Cl.
CPC .............. *H01M 4/921* (2013.01); *H01M 4/925* (2013.01); *H01M 4/928* (2013.01); *H01M 8/086* (2013.01); *Y02E 60/50* (2013.01); *H01M 2008/1095* (2013.01); *Y10S 977/773* (2013.01); *Y10S 977/775* (2013.01)
USPC ........... 502/330; 502/339; 429/487; 429/524; 429/525; 429/526; 977/773; 977/775; 977/773

(58) Field of Classification Search
CPC ............ B01J 23/40; B01J 23/42; B01J 23/44; B01J 23/46; B01J 23/52; B01J 23/56; B01J 23/66; B82Y 30/00; H01M 4/8657; H01M 4/9058; H01M 4/92; H01M 4/921
USPC ........... 502/330, 339; 977/773, 775; 429/487, 429/524, 525, 526
See application file for complete search history.

(56) References Cited

U.S. PATENT DOCUMENTS

| | | |
|---|---|---|
| 4,163,736 A | 8/1979 | Acres et al. |
| 4,457,986 A | 7/1984 | Bindra et al. |

(Continued)

OTHER PUBLICATIONS

Chen et al., "Alkanethiolate-Protected Copper Nanoparticles: Spectroscopy, Electrochemistry, and Solid-State Morphological Evolution" J. Phys. Chem. B 2001, 105, 8816-8820.

(Continued)

*Primary Examiner* — Cam N. Nguyen
(74) *Attorney, Agent, or Firm* — Seed IP Law Group PLLC

(57) ABSTRACT

A catalytic nanoparticle includes a porous, hollow core and an atomically thin layer of platinum atoms on the core. The core is a porous palladium, palladium-M or platinum-M core, where M is selected from the group consisting of gold, iridium, osmium, palladium, rhenium, rhodium and ruthenium.

20 Claims, 2 Drawing Sheets

(56) References Cited

U.S. PATENT DOCUMENTS

| | | | |
|---|---|---|---|
| 6,194,338 B1 | 2/2001 | Andolfatto et al. | |
| 6,855,453 B2 | 2/2005 | Bett et al. | |
| 6,936,564 B2 | 8/2005 | Butz et al. | |
| 7,166,263 B2 | 1/2007 | Vanderspurt et al. | |
| 7,311,754 B2 | 12/2007 | Virkar et al. | |
| 7,612,011 B2 | 11/2009 | Vanderspurt et al. | |
| 7,955,755 B2* | 6/2011 | McGrath et al. | 429/524 |
| 7,972,437 B2* | 7/2011 | Alivisatos et al. | 117/2 |
| 8,048,548 B2* | 11/2011 | Adzic et al. | 429/524 |
| 8,227,372 B2* | 7/2012 | Lopez et al. | 502/182 |
| 8,288,308 B2* | 10/2012 | Lopez et al. | 502/185 |
| 8,304,362 B2* | 11/2012 | Lopez et al. | 502/185 |
| 2006/0057440 A1 | 3/2006 | Ballantine et al. | |
| 2006/0112785 A1 | 6/2006 | Garbar et al. | |
| 2006/0134505 A1* | 6/2006 | Wang et al. | 429/40 |
| 2006/0135359 A1* | 6/2006 | Adzic et al. | 502/326 |
| 2007/0010396 A1 | 1/2007 | Giaquinta et al. | |
| 2007/0026292 A1* | 2/2007 | Adzic et al. | 429/44 |
| 2007/0026294 A1* | 2/2007 | Shimazaki et al. | 429/44 |
| 2007/0031722 A1* | 2/2007 | Adzic et al. | 429/44 |
| 2008/0038615 A1* | 2/2008 | Son | 429/30 |
| 2008/0107956 A1* | 5/2008 | Yoo et al. | 429/41 |
| 2008/0206562 A1* | 8/2008 | Stucky et al. | 428/403 |
| 2008/0286616 A1 | 11/2008 | Motupally et al. | |
| 2009/0035575 A1 | 2/2009 | Tsai et al. | |
| 2009/0053512 A1* | 2/2009 | Pyun et al. | 428/336 |
| 2009/0061286 A1 | 3/2009 | Alexandrovichserov et al. | |
| 2009/0114061 A1 | 5/2009 | Strasser et al. | |
| 2009/0192030 A1 | 7/2009 | Myers et al. | |
| 2009/0203196 A1 | 8/2009 | Kim et al. | |
| 2009/0297913 A1* | 12/2009 | Zhang et al. | 429/33 |
| 2009/0297924 A9* | 12/2009 | Shimazaki et al. | 429/44 |
| 2010/0009338 A1 | 1/2010 | Zhang et al. | |
| 2010/0056366 A1* | 3/2010 | Lee | 502/300 |
| 2010/0099012 A1* | 4/2010 | Adzic | 429/44 |
| 2010/0323274 A1* | 12/2010 | Ueno et al. | 429/487 |
| 2011/0177432 A1* | 7/2011 | Erlebacher et al. | 429/524 |
| 2011/0275009 A1* | 11/2011 | Goto et al. | 429/506 |
| 2012/0238442 A1* | 9/2012 | Lee | 502/242 |

OTHER PUBLICATIONS

The International Search Report and Written Opinion in counterpart PCT Application PCT/US2010/000415 filed Feb. 12, 2010.

Lu et al., "Galvanic replacement reaction: a simple and powerful route to hollow and porous metal nanostructures." Journal of Nanoengineering and Nanosystems, 2007. vol. 221, No. 1, pp. 1-16.

Xu et al., "Nanotubular Mesoporous Bimetallic Nanostructures with Enhanced Electrocatalytic Performance." Advanced Materials, 2009, vol. 21, pp. 2165-2169.

Zhang et al., "Platinum Manolayer Electrocatalysts for O2 Reduction: Pt Monolayer on Pd(111) and on Carbon-Supported Pd Nanoparticles." J. Phys. Chem. B, 2004. vol. 108, pp. 10955-10964.

Chen, Shaowei et al. "Alkanethiolate-Protected Copper Nanoparticles: Spectroscopy, Electronchemistry, and Solid-State Morphological Evolution." J. Phys. Chem. B. Jul. 27, 2001, 105. pp. 8816-8820. American Chemical Society.

Adzic, R.R. et al. "Platinum Monolayer Fuel Cell Electrocatalysts." Top Catal. Nov. 27, 2007. 46. pp. 249-262.

Lim, Byungkwon et al. "Pd-Pt Bimetallic Nanodendrites with High Activity for Oxygen Reduction." Science. Jun. 5, 2009. 324. pp. 1302-1305.

Peng, Zhenmeng et al. "Designer platinum nanoparticles: Control of shape, composition in alloy, nanostructure and electrocatalytic property." Nano Today. Nov. 4, 2008. 4. pp. 143-164.

Koh, Shirlaine et al. "Electrocatalysis on Bimetallic Surfaces: Modifying Catalytic Reactivity for Oxygen Reduction by Voltammetric Surface Dealloying." J. Am. Chem. Soc. Jul. 5, 2007. 129. pp. 12624-12625.

Chen et al., "Hollow Platinum Spheres with Nano-Channels: Synthesis and Enhanced Catalysis for Oxygen Reduction," J. Phys. Chem. C, 2008, 112(20), pp. 7522-7526.

\* cited by examiner

PLATINUM MONOLAYER ON HOLLOW, POROUS NANOPARTICLES WITH HIGH SURFACE AREAS AND METHOD OF MAKING

BACKGROUND

Platinum or platinum alloy nanoparticles are well known for use as an electrocatalyst, particularly in fuel cells used to produce electrical energy. For example, in a hydrogen fuel cell, a platinum catalyst is used to oxidize hydrogen gas into protons and electrons at the anode of the fuel cell. At the cathode of the fuel cell, the platinum catalyst triggers the oxygen reduction reaction (ORR), leading to formation of water.

Although platinum is a preferred material for use as a catalyst in a fuel cell, platinum is expensive. Moreover, the fuel cell performance is dependent on the available surface area of the platinum nanoparticles. Fuel cell performance increases when the surface area of platinum nanoparticles is increased by increasing the loading of platinum. However, increasing platinum loading typically also increases the cost of materials.

SUMMARY

A catalytic nanoparticle includes a porous, hollow core and a monolayer of platinum atoms on the core. The core is a porous, hollow palladium, palladium-M or platinum-M core, where M is selected from the group consisting of gold, iridium, osmium, palladium, rhenium, rhodium and ruthenium.

DETAILED DESCRIPTION

Catalytic nanoparticles having porous, hollow cores and monolayer of platinum atoms are described herein. These nanoparticles can be used in fuel cells and other electrochemical devices.

Figure 1:
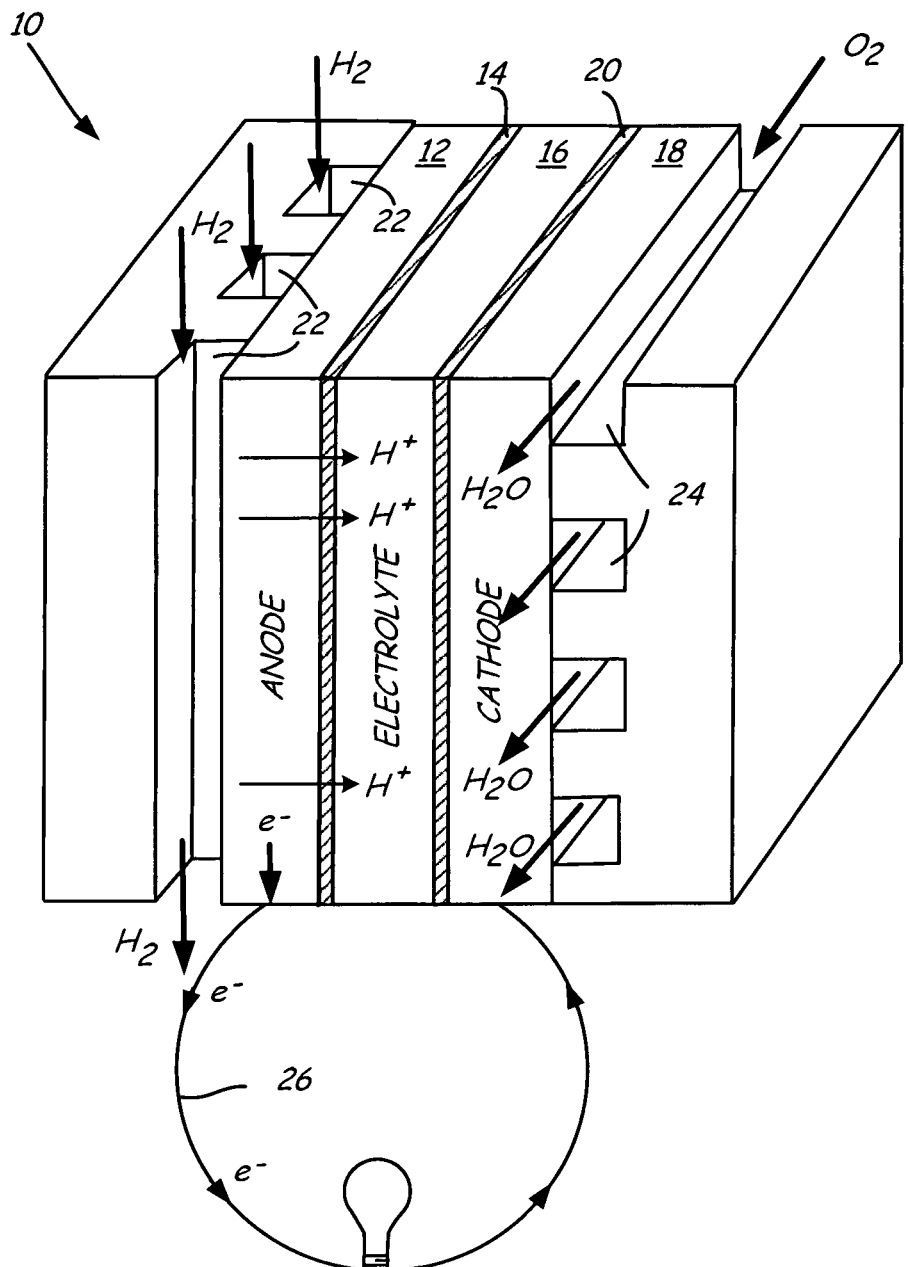
FIG. 1 is a schematic of a fuel cell that uses the catalytic nanoparticles described herein.

FIG. 1 is one example fuel cell 10, designed for generating electrical energy, that includes anode gas diffusion layer (GDL) 12, anode catalyst layer 14, electrolyte 16, cathode gas diffusion layer (GDL) 18, and cathode catalyst layer 20. Anode GDL 12 faces anode flow field 22 and cathode 18 GDL faces cathode flow field 24. In one example, fuel cell 10 is a fuel cell using hydrogen as fuel and oxygen as oxidant. It is recognized that other types of fuels and oxidants may be used in fuel cell 10.

Anode GDL 12 receives hydrogen gas ($H_2$) by way of anode flow field 22. Catalyst layer 14, which may be a platinum catalyst, causes the hydrogen molecules to split into protons ($H^+$) and electrons ($e^-$). While electrolyte 16 allows the protons to pass through to cathode 18, the electrons travel through an external circuit 26, resulting in a production of electrical power. Air or pure oxygen ($O_2$) is supplied to cathode 18 through cathode flow field 24. At cathode catalyst layer 20, oxygen molecules react with the protons from anode catalyst layer 14 to form water ($H_2O$), which then exits fuel cell 10, along with excess heat.

Electrolyte 16 varies depending on the particular type of fuel cell. In one example, fuel cell 10 is a polymer electrolyte membrane (PEM) fuel cell, in which case electrolyte 16 is a proton exchange membrane formed from a solid polymer. In another example, fuel cell 10 is a phosphoric acid fuel cell, and electrolyte 16 is liquid phosphoric acid, which is typically held within a ceramic (electrically insulating) matrix.

Platinum particles can form the basis of anode catalyst layer 14 and cathode catalyst layer 20. The platinum particles are typically dispersed and stabilized on catalyst support structures and/or on carbon. The platinum is used to increase the rate of the oxygen reduction reaction (ORR) in the fuel cell.

Figure 2:
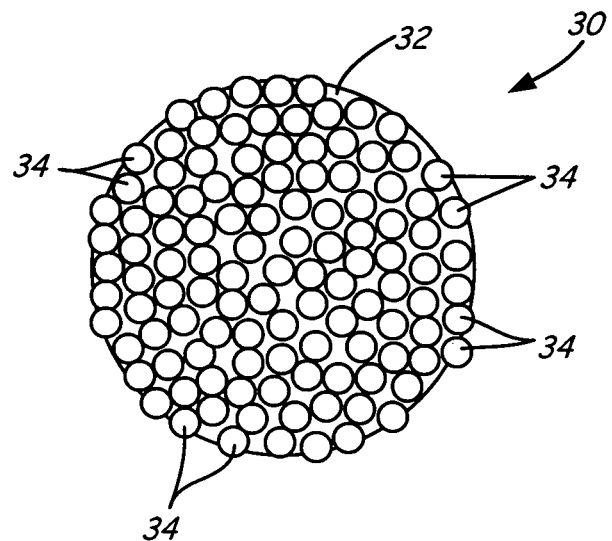
FIG. 2 is a schematic diagram of a catalytic nanoparticle having a porous and hollow core.

FIG. 2 schematically represents catalytic nanoparticle 30 having porous, hollow core 32 and platinum atoms 34. Catalytic nanoparticle 30 has a core-shell structure. Platinum 34 forms an atomically thin layer on core 32. Platinum atoms can, for example, form a monolayer, a bilayer or a trilayer on core 32. In one example, core 32 is between about 2 nanometers (nm) and about 20 nm in diameter.

Core 32 is porous or is full of pores. In one example, core 32 has pore sizes between about 0.5 nanometers (nm) and about 5.0 nm. In another example, core 32 has pores between about 1.0 nm about 5.0 nm.

Core 32 is also hollow. That is, core 32 has a cavity within it. For example, core 32 may have a cavity at its center while the outer surfaces of core 32 are formed from a porous metal structure. The porous, hollow structure of core 32 provides an increased surface area for platinum 34, which improves the platinum mass activity. The porous, hollow structure of core 32 also allows oxygen molecules to more easily diffuse through porous core 32. This porous, hollow core structure improves the oxygen reduction reaction kinetics when catalytic nanoparticles 30 are used in, for example, a fuel cell.

Core 32 can include palladium, a palladium-noble metal alloy or a platinum-noble metal alloy where the noble metal is selected from gold, palladium, iridium, rhenium, rhodium, ruthenium and osmium. Core 32 may not have the same lattice structure as the bulk metal of which it is formed. For example, when core 32 is formed of palladium, the lattice structure of core 32 is smaller than that of bulk palladium. The original lattice structure of the material of core 32 is altered during the production of core 32.

The core-shell structure of nanoparticle 30 improves the durability of the catalytic nanoparticle. A palladium core alone is not stable in a fuel cell environment. Palladium is more reactive than platinum and will dissolve at a less positive potential. Depositing a shell of platinum 34 on core 32 improves the durability of core 32.

Catalytic nanoparticles 30 can reduce overall catalyst cost. Catalytic nanoparticles are expensive to produce because of the high cost of noble metals, particularly the high cost of platinum. The core-shell structure of catalytic nanoparticles 30 reduces costs because the high cost platinum is limited to the surface of catalytic nanoparticles 30 while core 32 is formed from less expensive palladium or palladium-M. Thus, platinum is present only where it is utilized for the reactions of the fuel cell. Additionally, the porous structure of core 32 reduces the noble metal loading of catalytic nanoparticles 30.

As described further below, porous, hollow core 32 is formed by replacing transition metal atoms of a non-noble transition metal nanoparticle with palladium, palladium-noble metal alloy or platinum-noble metal alloy atoms. Hollow core 32 has a reduced noble metal loading which reduces the cost of materials compared to cores formed of solid noble metal.

Figure 3:
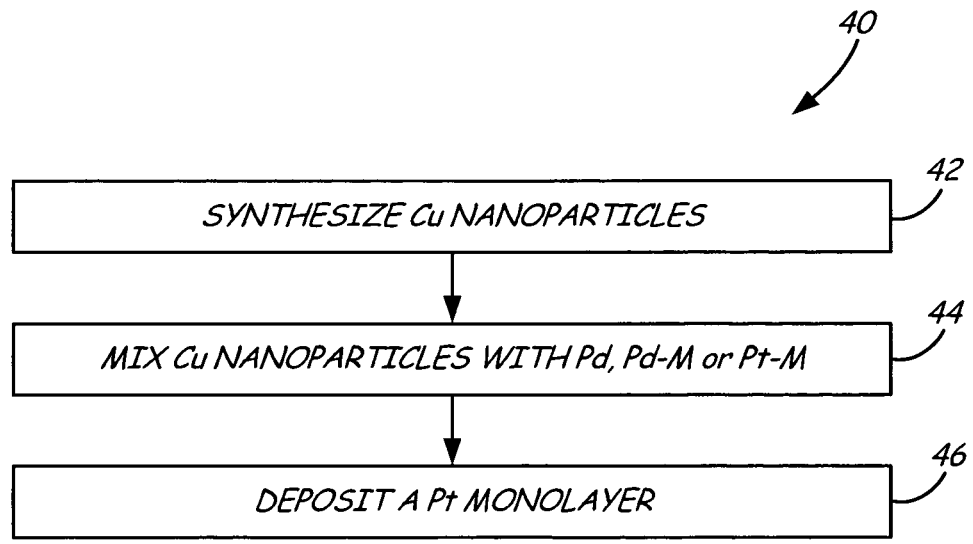
FIG. 3 is a block diagram of a method of forming the catalytic nanoparticle of FIG. 2 with a copper nanoparticle.

FIG. 3 is a block diagram illustrating method 40 for forming catalytic nanoparticles 30 of FIG. 2 from non-noble transition metal nanoparticles. Method 40 includes the steps of synthesizing copper nanoparticles (step 42), mixing copper nanoparticles with palladium, a palladium-M alloy or a platinum-M alloy, where M is a noble metal (step 44) and depositing a platinum monolayer (step 46).

First, in step 42, copper nanoparticles having a small particle size (i.e. about 1 nm-20 nm) are synthesized. The small particle size copper nanoparticles are synthesized using surfactants as described in *J. Phys. Chem. B* 2001, 105, 8816-882 by Chen et al. For example, a copper precursor, such as $Cu(NO_3)_2$, is reduced in the presence of a reducing agent (superhydride) and capping materials (tetra-n-octylammonium bromide) in tetrahydrofuran solvent. The copper nanoparticles were than loaded on supports, such as carbon black, and heat treated to remove the capping material.

Next, in step 44, the copper nanoparticles are mixed with a solution containing either a palladium salt, a palladium-M alloy salt or platinum-M alloy salt, where M is a noble metal selected from gold, palladium, iridium, rhodium, rhenium, ruthenium and osmium. In one example, a palladium salt is used. The palladium ions in solution are spontaneously reduced by the copper atoms of the nanoparticle in the oxidation reduction reaction of equation (1), and palladium atoms replace the copper atoms.

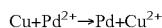

$$Cu+Pd^{2+} \rightarrow Pd+Cu^{2+}$$

As the reaction continues, palladium will deposit on the surface of the nanoparticle and every copper atom will dissolve. When the reaction reaches completion, core 32 will be a hollow, porous palladium core. In one example, hollow, porous cores 32 have a diameter between about 2 nm and about 20 nm. In another example, hollow, porous cores 32 have a pore size between about 1 nm to about 5 nm. The dissolved copper can be recovered and reused to reduce the cost of materials.

The palladium-M alloy and the platinum-M alloy behave in a similar matter to form hollow, porous palladium-M alloy cores and hollow, porous platinum-M alloy cores, respectively. The platinum to noble metal mole ratio of the platinum-M alloy can be adjusted to maintain a small platinum loading. In one example, the platinum to noble metal M mole ratio is about 1:2 to about 1:12. In another example, the platinum to noble metal M mole ratio is about 1:3 to about 1:6. Maintaining a small platinum to noble metal mole ratio reduces the material costs.

The initial concentration of the salt solution is calculated to have a palladium to copper, a palladium-M alloy to copper or platinum-M alloy to copper mole ratio of about 1:1 when the copper nanoparticles are mixed with the salt solution. That is, the moles of palladium, palladium-M alloy or platinum-M alloy in the salt solution equal the moles of copper of the copper nanoparticles. This allows all or almost all of the copper of the copper nanoparticles to react during the oxidation reduction reaction. A higher mole ratio (i.e. 5:1) results in the reaction being limited by the available copper while a lower mole ratio (i.e. 1:5) results in traces of copper remaining in the core after the reaction.

During the oxidation reduction reaction of step 44, the mixture can be saturated with nitrogen. Nitrogen saturation avoids oxide formation on copper.

In step 46, a platinum monolayer is deposited on the porous, hollow cores. This step includes depositing copper on the porous, hollow cores by underpotential deposition, and replacing or displacing the copper with platinum to form catalytic nanoparticles 30 of FIG. 2.

Underpotential deposition is an electrochemical process that results in the deposition of one or two monolayers of a metal (copper) onto the surface of another metal (palladium) at a potential positive of the thermodynamic potential for the reaction. Thermodynamically, underpotential deposition occurs because the work function of copper is lower than that of the palladium nanoparticles.

The copper is deposited as a continuous or semi-continuous monolayer of copper atoms on the porous, hollow cores. The copper monolayer can contain pinholes where gaps or spaces exist in the layer. In one example, porous, hollow palladium cores deposited on an electrically conductive substrate were placed in a solution consisting of 0.05 M $CuSO_4$ + 0.05 M $H_2SO_4$ saturated with argon and the potential was controlled at 0.1 V (vs. Ag/AgCl, 3M) for 5 minutes resulting in the underpotential deposition of copper on the porous, hollow cores.

Next, platinum is deposited on the porous, hollow cores by displacing the copper atoms to form catalytic nanoparticles 30 of FIG. 2. Through an oxidation reduction reaction, platinum atoms displace the copper atoms on the porous, hollow cores. For example, the porous, hollow cores can be mixed with an aqueous solution containing a platinum salt. In a specific example, the platinum solution is 2 mM $PtK_2Cl_4$ + 0.05 M $H_2SO_4$ saturated with argon. Platinum ions of the solution are spontaneous reduced by copper as shown in equation (2), and platinum replaces copper on the porous, hollow cores.

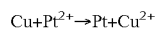

$$Cu+Pt^{2+} \rightarrow Pt+Cu^{2+}$$

The platinum atoms are deposited as an atomically thin layer on the porous, hollow cores. In one example, the atomically thin layer is a platinum monolayer. The platinum monolayer generally covers the porous, hollow core. However, some portions of the porous, hollow core may not be covered. Repeating step 46, including the under potential deposition of copper atoms and displacing the copper with platinum, results in the deposition of additional platinum layers on core 32. For example, a bilayer or a trilayer of platinum atoms can be formed on core 32.

The catalytic nanoparticles formed by method 40 have an improved platinum mass activity. In method 40, the lattice constant of core 32 is affected by the copper nanoparticles. For example, when deposited on the copper nanoparticle, the lattice constant of palladium must be smaller than that of bulk palladium due to the effect of copper. This change to the lattice constant of core 32 will affect the structural effect of core 32 on platinum 34 and increase the platinum mass activity of catalytic nanoparticles 30. Palladium-M alloys and platinum-M alloys will experience similar effects by the copper nanoparticles.

The palladium-M alloy and the platinum-M alloy enable additional tailoring of the structural effect of core 32. For example, the mole ratio of the palladium-M alloy can be adjusted to change tune the structural effect of core 32.

Additionally, catalytic nanoparticles formed by method 40 have a reduced noble metal loading. As discussed above, the large noble metal loading of catalytic nanoparticles makes them expensive to produce. The nanoparticles of method 40 have a reduced noble metal loading because the resulting core 32 is hollow and porous. Thus, the cost of materials for these nanoparticles is reduced. Additionally, the copper from the copper nanoparticles can be recovered and reused to further reduce the cost of materials.

The porous, hollow cores produced in method 40 can be formed with palladium, a palladium-noble metal alloy or a platinum-noble metal alloy. The platinum-noble metal alloy can improve the stability of core 32. The platinum monolayer may not completely cover core 32 and the noble metal, such as palladium, of core 32 can be dissolved through the pinholes of platinum 34 if the noble metal is more reactive than platinum. The platinum of the platinum-noble metal core protects portions of core 32 that are exposed and reduces dissolution of the core.

The concentration of the salt solution is calculated so that the palladium, palladium-M alloy or platinum-M alloy displaces all the copper atoms of the nanoparticles. Having a palladium:copper, palladium-M alloy:copper or platinum-M alloy:copper mole ratio of 1:1 results in displacing all or almost all of the copper atoms of the copper nanoparticle and reduces the trace amount of copper remaining in the core structure. This reduces the risk of membrane, ionomer and/or anode poisoning when catalytic nanoparticles 30 are used in a fuel cell.

In method 40 described above, small copper nanoparticles were added to a solution containing a palladium salt, a palladium-M alloy salt or a platinum-M alloy salt. One skilled in the art will recognize that the method is not limited to the use of copper nanoparticles. Other non-noble transition metals that reduce palladium and platinum can be used in place of copper. The non-noble transition metal should have a lattice constant smaller than that of bulk platinum in order to gain the structural effect benefits described above. Further, adjusting the composition of the non-noble transition metal nanoparticles enables additional tailoring of the structural effect of core 32.

The present invention is more particularly described in the following prophetic example that is intended as illustration only, since numerous modifications and variations within the scope of the present invention will be apparent to those skilled in the art.

EXAMPLE

First, copper nanoparticles are formed by reducing $Cu(NO_3)_2$ in the presence of superhydride and tetra-n-octylammonium bromide in tetrahydrofuran solvent. The copper nanoparticles are then loaded on supports, such as carbon black, and heat treated to remove the capping material.

Next, the copper nanoparticles are mixed with a palladium salt solution consisting of 2 mM $Pd(NO_3)_2$+0.05 M $H_2SO_4$ saturated with nitrogen. The concentration of the salt solution is calculated so that when mixed with the copper nanoparticles the Pd:Cu mole ratio is about 1:1.

The resulting porous, hollow palladium cores are placed in an electrochemical cell with a solution consisting of 0.05 M $CuSO_4$+0.05 M $H_2SO_4$+1 M $K_2SO_4$ saturated with argon. The potential is controlled at 0.1 V (vs. Ag/AgCl, 3M) for 5 minutes and copper atoms deposit on the surface of the porous palladium cores. 200 ml of 2 mM $PtK_2Cl_4$+0.05 M $H_2SO_4$ saturated with argon is then quickly added into the cell without potential control. The reaction is kept for 30 minutes to ensure all the copper atoms are displaced with platinum atoms. The final products are collected by washing with water and drying in an oven.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A catalytic nanoparticle comprising:
    a porous, hollow palladium, palladium-M or platinum-M core, where M is selected from the group consisting of gold, iridium, osmium, palladium, rhenium, rhodium and ruthenium; and
    an atomically thin layer of platinum atoms on the core.

2. The catalytic nanoparticle of claim 1 wherein a lattice constant of the porous, hollow palladium core is less than that of bulk palladium.

3. The catalytic nanoparticle of claim 1 wherein a lattice constant of the porous, hollow platinum-M core is less than that of bulk platinum-M.

4. The catalytic nanoparticle of claim 1 wherein core has pores between about 1 nanometer and about 5 nanometers.

5. The catalytic nanoparticle of claim 1 wherein the core has a diameter between about 2 nanometers and about 20 nanometers.

6. The catalytic nanoparticle of claim 1 wherein the atomically thin layer of platinum atoms is selected from the group consisting of a monolayer, a bilayer and a trilayer of platinum metal atoms.

7. The catalytic nanoparticle of claim 1, wherein the porous, hollow platinum-M core has a platinum:M mole ratio between about 1:2 and about 1:12.

8. The catalytic nanoparticle of claim 1, wherein the porous, hollow platinum-M core has a platinum:M mole ratio between about 1:3 and about 1:6.

9. A method for forming a catalytic structure, the method comprising:
    forming non-noble transition metal nanoparticles;
    replacing non-noble transition metal atoms of the non-noble transition metal nanoparticles with palladium, palladium-M or platinum-M alloy atoms, where M is selected from the group consisting of gold, iridium, osmium, palladium, rhenium, rhodium and ruthenium, to form a porous, hollow palladium, palladium-M or platinum-M core; and
    depositing an atomically thin layer of platinum atoms on the porous, hollow core.

10. The method of claim 9 wherein the non-noble transition metal nanoparticles are copper nanoparticles.

11. The method of claim 10 wherein the porous, hollow core has pores with a pore size between about 1 nanometer and about 5 nanometers.

12. The method of claim 10 wherein the porous, hollow core has a diameter between about 2 nanometers and about 20 nanometers.

13. The method of claim 10 wherein the core is formed from platinum-M alloy having a platinum:M mole ratio between about 1:2 to about 1:12.

14. The method of claim 9 wherein the non-noble transition metal nanoparticles have a lattice constant smaller than the lattice constant of platinum.

15. The method of claim 9 wherein the non-noble transition metal nanoparticles have a diameter between about 1 nanometer and about 20 nanometers.

16. The method of claim 9 wherein the step of depositing a monolayer of platinum atoms comprises:
    depositing a copper monolayer on the porous, hollow core; and
    replacing the copper monolayer with the monolayer of platinum atoms.

17. The method of claim 9 wherein the step of depositing a monolayer of platinum atoms is repeated to form a bilayer or a trilayer of platinum atoms.

18. The method of claim 9 wherein the step of replacing the non-noble transition metal atoms comprises:
    mixing the non-noble transition metal nanoparticles with a solution containing a palladium salt or a palladium-M alloy salt.

19. The method of claim 9 wherein the step of replacing the non-noble transition metal atoms comprises:
    mixing the non-noble transition metal nanoparticles with a solution containing a platinum-M alloy salt.

20. The method of claim 19 wherein the step of mixing the non-noble transition metal nanoparticles with a solution containing a platinum-M alloy salt comprises:
    forming a solution having a platinum-M alloy concentration such that when the non-noble transition metal nanoparticles are added to the solution the platinum-M:non-noble transition metal is about 1:1.

* * * * *